No. 684,732. Patented Oct. 15, 1901.
R. H. VILLARD.
COUPLING FOR SECTIONAL THREADING RODS.
(Application filed Feb. 27, 1901.)
(No Model.) 2 Sheets—Sheet 1.
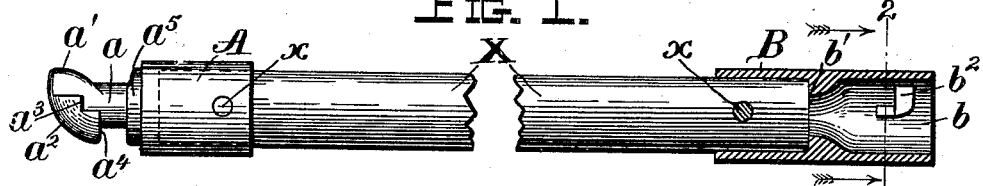
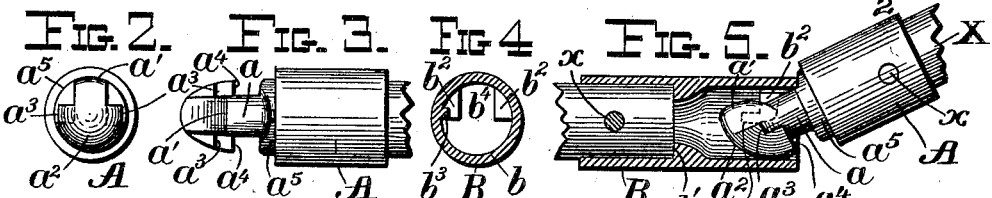
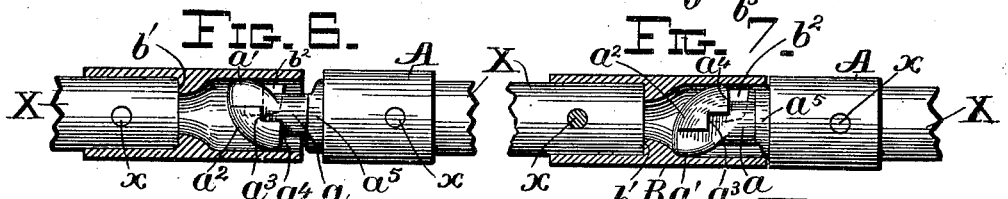
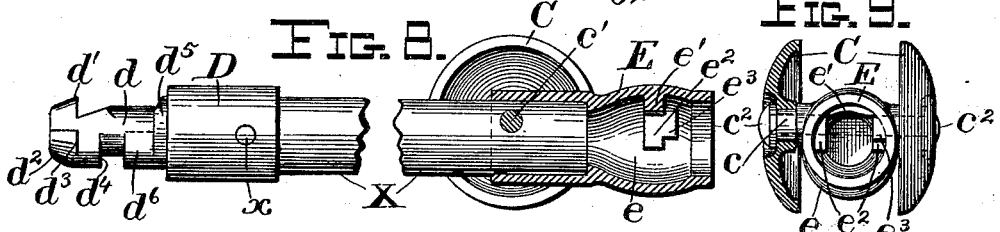
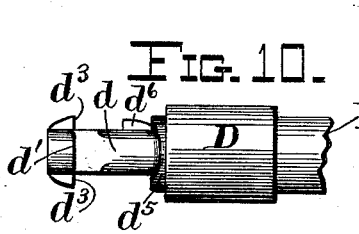
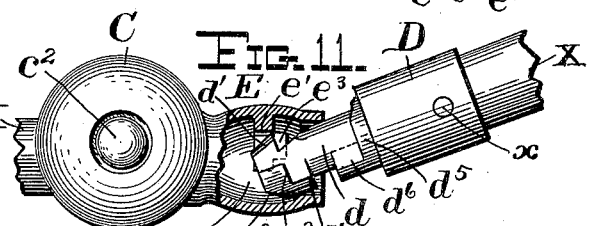
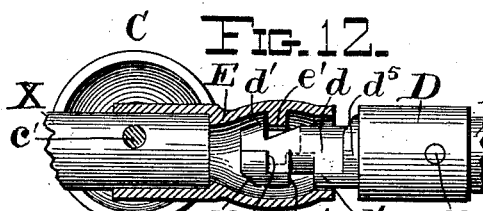
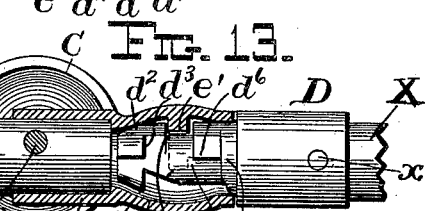
Witnesses
Percy C. Bowen
Clarence A. Bateman
Inventor
R. H. Villard
by Wilkinson & Fisher
Attorneys.

No. 684,732. Patented Oct. 15, 1901.
R. H. VILLARD.
COUPLING FOR SECTIONAL THREADING RODS.
(Application filed Feb. 27, 1901.)
(No Model.) 2 Sheets—Sheet 2.
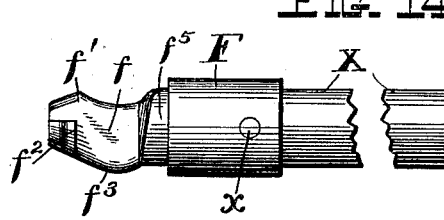
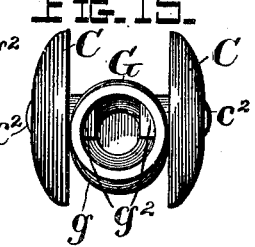
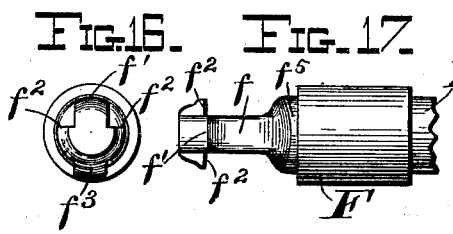
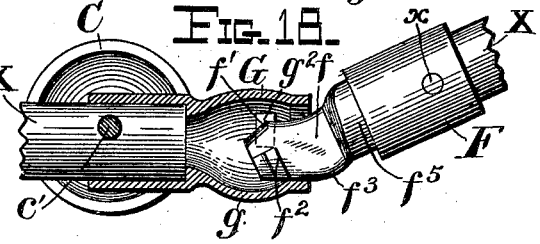
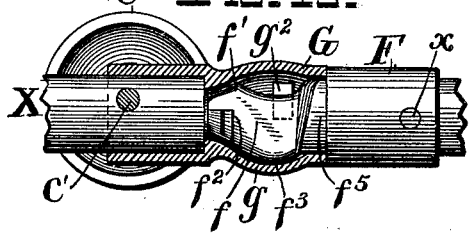
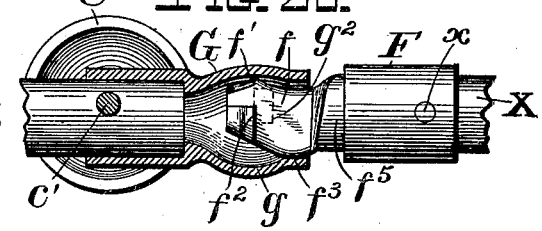
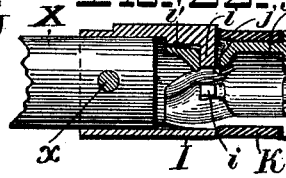
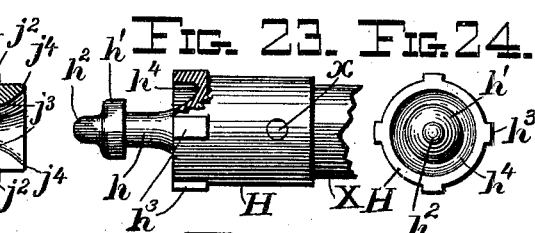
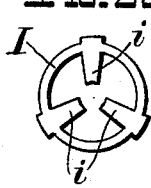
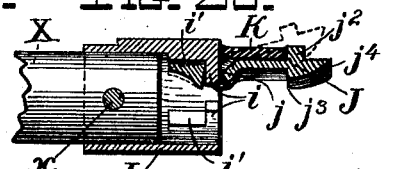
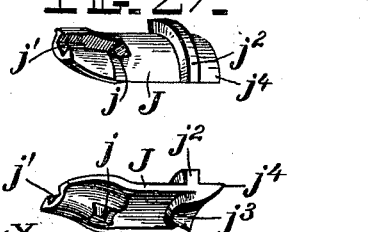
Witnesses
Percy C. Bowen
Clarence A. Bateman
Inventor
R. H. Villard
by Wilkinson & Fisher,
Attorneys.

UNITED STATES PATENT OFFICE.

RICHARD H. VILLARD, OF ROCHESTER, NEW YORK.

COUPLING FOR SECTIONAL THREADING-RODS.

SPECIFICATION forming part of Letters Patent No. 684,732, dated October 15, 1901.

Application filed February 27, 1901. Serial No. 49,132. (No model.)

*To all whom it may concern:*

Be it known that I, RICHARD H. VILLARD, a citizen of the United States, residing at Rochester, in the county of Monroe and State of New York, have invented certain new and useful Improvements in Couplings for Sectional Threading-Rods; and I do hereby declare the following to be a full, clear, and exact description of the invention, such as will enable others skilled in the art to which it appertains to make and use the same.

My invention relates to that class of couplings for use in connection with sectional threading-rods for underground conduits; and its object is to produce a joint which can be simply and quickly made and yet possess all the advantages of a solid joint, such as has been heretofore used for this purpose.

Attempts have been made to replace the threaded or pipe-coupling joints now commonly used with a joint which can be more quickly made; but they all have defects which prevent them from coming into practical use. In using the pipe-coupling or threaded connections a tight and rigid joint is effected, and in pushing the rods through the conduits the attendant has to overcome the friction due to the weight of the parts only; but when an attempt is made to use the more-easily-detachable joints such as have been heretofore known a loose or flexible joint is formed, and in pushing the rods from one end of the conduit to another it has been found that the rods buckle under the strain and form a zigzag line, destroying the alinement, the ends of the rods being forced against the sides of the conduits and causing considerable friction, sometimes making it necessary to employ the combined strength of several attendants to manipulate the rods. These difficulties have been obviated in my invention, and at the same time a more secure and quickly-made coupling is provided, as will be more fully hereinafter described.

In order to more fully describe my said invention, reference will be had to the accompanying drawings, in which the same letters represent the same parts throughout the views.

Figure 1 represents a side elevation of a rod fitted with a pair of my couplings. Fig. 2 is an end view of Fig. 1 looking from the left. Fig. 3 is a plan view of one of the couplings shown in Fig. 1. Fig. 4 is a section on line 2 2 of Fig. 1 looking in the direction of the arrows. Fig. 5 is a view, partly in section, showing how one of the coupling members is inserted within the other at an angle thereto. Fig. 6 is a view showing the couplings as they appear before finally locked. Fig. 7 shows the couplings as finally locked. Fig. 8 is a view of another form of my invention. Fig. 9 is an end elevation of the same looking from the right. Fig. 10 is a plan view showing one of the couplings shown in Fig. 8. Fig. 11 is a view, partly in section, showing one of the couplings partly inserted within the other. Fig. 12 is a view showing the couplings before being finally locked. Fig. 13 is a view of the same, showing the couplings locked. Fig. 14 is a view showing another form of my coupling. Fig. 15 is an end view of the same looking from the right in Fig. 14. Fig. 16 is also an end elevation of the same looking from the left in Fig. 14. Fig. 17 is a plan view showing one of the couplings. Fig. 18 is a view, partly in section, showing how the couplings are interlocked. Fig. 19 is a view showing the couplings pressed together. Fig. 20 shows the position of the parts when under tension. Fig. 21 shows an end view of a modification of one of the couplings. Fig. 22 is an elevation of the same, partly in section. Fig. 23 is an elevation of the corresponding coupling. Fig. 24 is an end elevation of the same. Fig. 25 is a view of Fig. 26 looking from the right, with the jaws removed, showing the retaining-lugs. Fig. 26 is a view in section, showing the movement of one of the jaws in dotted lines. Fig. 27 is a perspective view of one of the jaws looking from the top thereof. Fig. 28 is a similar view of one of the jaws looking from the bottom thereof, and Fig. 29 is a view showing a modified form of coupling to be used with the form shown in Fig. 14.

Referring first to the form shown in Figs. 1 to 7, inclusive, Fig. 1 shows a rod X, of any suitable material and shape, provided at one end with the member A and upon its opposite end with the member B. The member A is provided with an extension $a$, having at its extremity the pointed upwardly-extending ear $a'$. The lug $a^2$ is located directly opposite said ear $a'$, and the curved face of said lug forms a continuation of the curve of the front of the ear $a'$, for a purpose that will hereinafter appear. Upon the rear of this lug $a^2$ are formed two abutments $a^3$ and $a^4$, which form the locking-surfaces. $a^5$ is a flange which holds the two members in alinement when coupled together. The member B, into which the member A is adapted to be inserted, is formed with a hollow cylindrical chamber $b$, having the annular ring $b'$ cast therein to form an abutment for the end of the rod X. Within this cylindrical chamber $b$ are the lugs $b^2 b^2$, one of which is located at each side of said chamber and directly opposite, leaving the opening $b^4$ between them. Behind one of these lugs $b^2 b^2$ is provided a stop $b^3$, the purpose of which will hereinafter appear. In using this form of coupling it is possible to make two kinds of a joint—a flexible joint, in which it is only necessary to insert the end of the member A within the aperture of member B and bring the two into alinement, and a rigid joint, in which the parts are interlocked and then given a partial rotation, which makes a firm and rigid connection.

In making the first form of joint a rod having at one end the member A is brought into contact with a rod provided with the coupling member B at its rear end, as shown in Fig. 5. In inserting the extension $a$ within the chamber $b$ the pointed ear $a'$ is allowed to pass through the opening $b^4$ between the lugs $b^2 b^2$, the curved or cut-away face of the lug $a^2$ permitting it to pass freely. To lock the parts, it is only necessary to bring the members down into the position shown in Fig. 6, when the abutments $a^3 a^3$ upon each side of the lug $a^2$ will be held behind the inner surfaces of the lugs $b^2 b^2$. When locked in this manner, rotation of the parts is prevented by the lugs $b^2 b^2$ fitting into the recess formed between the abutting surfaces $a^3 a^4$.

In making the second form of joint the steps above mentioned are repeated, but an additional step is necessary. After bringing the parts closely together a partial rotation is imparted to one of the members of the coupling, when, as will be seen in Fig. 7, instead of the abutments $a^3 a^3$ locking against the lugs $b^2 b^2$ the abutment $a^4$ will be held against the inner sides of said lugs $b^2 b^2$, locking the two couplings closely together, the flange $a^5$ upon the member A entering the chamber $b$ of the member B and holding the parts in alinement. To prevent the total rotation of either of the parts and the consequent unlocking of the same, the stop $b^3$ is provided behind one of the lugs $b^2$, which will abut against one of the recesses formed by the two abutting surfaces $a^3$ and $a^4$.

The first form of joint before described is especially adapted for instances where a very rapid and light joint is desired, and the second form may be used when considerable force is to be exerted and yet keep the parts in perfect alinement, thus preventing undue friction due to buckling, although it is obvious that any one of the forms may be used altogether.

Referring now to the modified form shown in Figs 8 to 13, inclusive, X represents the rod, carrying at one end the member D and at its opposite end the member E. Mounted at one end of the rod X, preferably upon the member E, are a pair of supporting wheels or rollers C, which are adapted to support the rods while traveling through the conduit, and thereby reduce the friction to a minimum. As shown in Figs. 8 and 9, these wheels are mounted upon studs $c$, projecting laterally from the coupling member E at a point above the center thereof, thereby throwing more weight below the center of said wheels than above. Passing transversely through said member E and through said studs $c$ is a transverse shaft $c'$, having at each end projections $c^2$ to retain the wheels upon their studs $c$. Referring now to the coupling member D, it will be seen that it is provided with the extension $d$, provided at its extremity with an outwardly-projecting tooth $d'$ and upon its opposite side with the lug $d^2$, having the two abutting surfaces $d^3$ and $d^4$. Behind the lug $d^2$ is provided a lug $d^6$, a space being left between the two lugs. Merging into the lug $d^6$ is the flange $d^5$. The member E is provided with a hollow globe-shaped aperture or chamber $e$, provided with an abutment $e'$ at the top thereof, and upon each side are located the lugs $e^2 e^2$. Formed integral with one of the lugs $e^2$ is the stop $e^3$. In this form of coupling it is possible to make two kinds of joints, as noted in the preceding case. To make the simple flexible joint, the end of the rod carrying the member D is brought into engagement with a rod carrying the member E in the manner shown in Fig. 11. The members are next brought into alinement, as shown in Fig. 12, when the tooth $d'$ will lock behind the rear face of the abutment $e'$. When pushing force is applied to these parts, the flange $d^5$ will move up and contact with the end of the member E and form a solid connection, and when tension is applied the parts will assume the position shown in Fig. 12; the tooth $d'$ engaging with the abutment $e'$, it being impossible to break the joint while the parts are kept in alinement.

As stated in the preceding case, the second kind of joint is made by pressing the parts together and then giving a partial rotation to one of the members. In this case this kind of joint is shown in Fig. 13. The abutment $e'$ engages between the two lugs $d^4$ and $d^6$, thereby forming a rigid and solid joint. To prevent the parts from being rotated too far, the stop $e^3$ is provided, against which the lug $d^6$ abuts when locked.

Figs. 14 to 20, inclusive, represent another modified form of coupling, and Fig. 29 shows a modification of one of the coupling parts employed with this form. X represents a rod having fitted upon one end the member F and upon its opposite end the coupling member G. Carried by the member G is a pair of wheels C, mounted as in the preceding case. The member F is provided with the extension $f$, having an upwardly-projecting ear $f'$, and upon its opposite side are provided the laterally-projecting lugs $f^2 f^2$. Behind said lugs $f^2$ is a swelled portion $f^3$. $f^5$ constitutes a flange. Upon the opposite end of said rod is a coupling member G, having the hollow globe-shaped portion $g$. Within said globe-shaped portion or aperture are oppositely-disposed lugs $g^2 g^2$, a space being left between them. This joint is made in the manner shown in Fig. 18, the ear $f'$ passing between the two lugs $g^2 g^2$. Fig. 19 shows the position the parts assume when pressure is applied or when the rods are being pushed through the conduit. Fig. 20 shows the position of the parts when under tension. The two lugs $f^2 f^2$ upon the member F engage behind the two lugs $g^2 g^2$ of the member G, and said lugs are held in such engagement by the swelled portion $f^3$, and so long as the members are held in alinement it is impossible to disengage the parts. In this form there is only one kind of joint that can be made, and that is the loose or comparatively flexible joint; but it is obvious that when pressure is applied to the parts a rigid and straight joint is made.

In Fig. 29 is shown a differently-shaped coupling member, adapted to be used interchangeably or as an alternative with the member F, Figs. 14 to 20, inclusive. In this form, instead of being provided with the swelled-out portion $f^3$, Fig. 14, said portion is made straight, as shown at $f^4$, Fig. 29.

Referring now to the form shown in Figs. 21 to 28, inclusive, this form of coupling is used in a somewhat different manner from the above-described couplings. This coupling is used when a connection is to be made between two sets of rods advancing toward each other while in the conduit. H represents one of the coupling members provided with the forwardly-extending plunger $h$. Upon the end of this plunger $h$ is formed a cup-shaped enlargement $h'$, provided with the point $h^2$. Around the cylindrical portion of this coupling member H is provided a series of lugs $h^3$, upon which the same slides while running through the conduit. I represents the corresponding member with which the member H is adapted to engage. Radially located within said member I are retaining-lugs $i$. J J are jaws provided with the transverse opening $j$ and the longitudinal slot $j'$, communicating with said opening. One end of these jaws J is somewhat tapered, as shown in Fig. 27. This tapered end is inserted into the opening in the coupling member I in such a manner that the end of the lug $i$ passes up into the opening $j$ and the elongated portion $i'$ of said lug enters the slot $j'$ in the jaw J, the opening $j$ being so shaped as to allow an outward swing of the jaws. Surrounding the jaws is a flexible or elastic band K, which is held in position by the annular lug $j^2$. The function of this band K is to hold the jaws in a closed position until forced open by the insertion of the plunger $h$. When this plunger has been fully inserted, the jaws, which have been forced apart by the enlargement $h'$ on the plunger $h$, will snap shut, and the teeth $j^3$ on the inside of the jaws J will engage the rear face of the enlargement $h'$ of the plunger, thereby locking the coupling. In order to separate or unlock the coupling, it is only necessary to separate the jaws by swinging either of the members I or H at an angle, the point $h^2$ on the plunger $h$ bearing against the opposing jaw or jaws and disengaging the same from the enlargement $h'$. When pressure is applied to the parts, the narrowed portion $j^4$ of the jaws enters the annular groove $h^4$ of the member H, the point $h^2$ of the plunger H resting in the opening left between the inner ends of said jaws and the ends of said retaining-lugs. Thus a rigid joint is formed and the parts are held securely in alinement. $x$ represents a fastening-pin adapted to pass diametrically through each coupling member and through the end of the rod X resting therein. It is obvious that when the antifriction wheels or rollers are employed the stud-shaft $c'$ takes the place of the pin $x$.

While my improvements are embodied in the forms illustrated, it will be obvious to any one skilled in the art that many changes might be made without departing from the spirit of my said invention, such changes being made to suit varying requirements; but under ordinary conditions the forms hereinbefore described are deemed sufficient.

Having thus described my said invention, what I claim, and desire to secure by Letters Patent of the United States, is—

1. In a coupling of the character described, the combination with an apertured member, and oppositely-disposed lugs or abutments within said aperture; of an engaging member having an extension adapted to enter said aperture, and a lug or lugs on said extension adapted to engage with the lugs of said apertured member and thereby lock the parts together, substantially as described.

2. In a coupling of the character described, the combination with an apertured member, and oppositely-disposed locking devices suitably arranged within said aperture; of an engaging member having an extension adapted to fit within said aperture, and means carried by said extension for interlocking with said locking devices, substantially as described.

3. In a coupling of the character described, the combination with an apertured member, and a plurality of locking devices suitably arranged within said aperture; of an engaging member, means carried by said engaging member for interlocking with said locking devices, and a flange carried by said engaging member adapted to enter said apertured member and hold the parts in alinement, substantially as described.

4. In a coupling of the character described, the combination with an apertured member, and a plurality of locking devices suitably arranged within said aperture; of an engaging member having an extension adapted to enter said aperture, and means carried by said extension for locking at a plurality of points against said locking devices in said aperture, substantially as described.

5. In a coupling of the character described, the combination with an apertured member, and a plurality of lugs within said aperture; of a member adapted to engage with said apertured member, an extension upon said apertured member, and a plurality of lugs or projections carried by said extension adapted to interlock with said lugs, within said aperture, substantially as described.

6. In a coupling of the character described, the combination with an apertured member, and a plurality of lugs within said aperture; of a member adapted to engage with said apertured member, an extension upon said apertured member, a plurality of lugs or projections carried by said extension adapted to interlock with said lugs within said aperture, and a flange carried by said engaging member adapted to enter said aperture and hold said members in alinement, substantially as described.

7. In a coupling of the character described, the combination with an apertured member, and a plurality of lugs within said aperture; of an engaging member having an extension thereon, and lugs upon said extension so arranged that a partial rotation of said member locks the two members together, substantially as described.

8. In a coupling of the character described, the combination with an apertured member, and a plurality of lugs within said aperture; of an engaging member having an extension provided with lugs so arranged that either a loose joint may be made, or by imparting a rotary motion to either member, a rigid joint may be made, substantially as described.

9. In a coupling of the character described, the combination with the apertured member, a pair of lugs oppositely disposed within said aperture; of an engaging member, an extension carried by said member adapted to enter said aperture, and a lug upon said extension having two engaging faces, each of said faces being adapted to lock behind said pair of lugs, substantially as described.

10. In a coupling of the character described, the combination with an apertured member, and a pair of lugs oppositely disposed within said aperture; of an engaging member, an extension carried by said member adapted to enter said aperture, and a recessed lug carried by said extension, in which said pair of lugs are adapted to engage, substantially as described.

11. In a coupling of the character described, the combination with an apertured member, and a pair of lugs oppositely disposed within said aperture; of an engaging member, an extension carried by said member adapted to enter said aperture, and a recessed lug carried by said extension, whereby said pair of lugs will engage in said recess, or after partial rotation of either of said members, will engage with the rear face of said recessed lug, substantially as described.

12. In a coupling of the character described, the combination with an apertured member, and a pair of lugs oppositely disposed within said aperture; of an engaging member, an extension carried by said member adapted to enter said aperture, a recessed lug carried by said extension, and a stop to arrest the rotation of the parts, substantially as described.

13. In a coupling of the character described, the combination with an apertured member, and a pair of lugs oppositely disposed within said aperture; of an engaging member, an extension carried by said member adapted to enter said aperture, a recessed lug carried by said extension, a stop to arrest the rotation of the parts, and a flange carried by said engaging extension adapted to enter said aperture and retain the members in alinement, substantially as described.

14. In a coupling of the character described, the combination with an apertured member, and a plurality of locking devices suitably disposed within said aperture; of an engaging member having an extension adapted to fit within said aperture, means carried by said extension for interlocking with said locking devices, and a pair of wheels mounted upon one of said members, substantially as described.

15. In a coupling of the character described, the combination with an apertured member, and a plurality of locking devices suitably disposed within said aperture; of an engaging member having an extension adapted to fit within said aperture, means carried by said extension for interlocking with said locking devices, and a pair of antifriction-wheels mounted upon studs carried by said apertured member, substantially as described.

16. In a coupling of the character described, the combination with an apertured member, and a plurality of locking devices suitably disposed within said aperture; of an engaging member having an extension adapted to fit within said aperture, means carried by said extension for interlocking with said locking devices, studs upon said apertured member near the top thereof, and wheels mounted upon said studs, substantially as described.

In testimony whereof I affix my signature in presence of two witnesses.

RICHARD H. VILLARD.

Witnesses:
CHARLES H. TAYLOR,
H. E. WETHERBEE.